United States Patent [19]

Mettler

[11] 3,747,013

[45] July 17, 1973

[54] TUNED-PLATE TUNED-GRID SHORT WAVE SIGNAL GENERATOR WITH POWER OUTPUT CONTROLLED BY SCREEN GRID

[75] Inventor: Hal C. Mettler, Pasadena, Calif.

[73] Assignees: Hal C. Mettler; Lovena Mettler, Anaheim, Calif.

[22] Filed: Sept. 2, 1971

[21] Appl. No.: 177,225

Related U.S. Application Data

[62] Division of Ser. No. 846,012, July 30, 1969, Pat. No. 3,638,657.

[52] U.S. Cl. ................. 331/74, 128/422, 219/10.75, 331/168, 331/182

[51] Int. Cl. .......................... A61n 5/00, H03b 5/10

[58] Field of Search ...................... 331/74, 167–171, 331/182; 219/10.75, 10.77; 128/422

[56] References Cited

UNITED STATES PATENTS

| | | | |
|---|---|---|---|
| 2,311,631 | 2/1943 | Bach | 331/182 X |
| 2,111,603 | 3/1938 | Usselman | 331/168 X |
| 2,695,021 | 11/1954 | Touzel | 128/421 X |

*Primary Examiner*—Roy Lake
*Assistant Examiner*—Siegfried H. Grimm
*Attorney*—D. Bruce Prout

[57] ABSTRACT

A signal generator having a vacuum tube in a tuned plate, tuned grid oscillator circuit. A coil is placed in the tuned plate circuit for providing short wave signals. The tube has at least a control grid connected to the tuned grid circuit and a screen grid. A circuit is coupled to the screen grid for enabling a signal to be fed back from the plate circuit through the screen grid to the control grid and comprises an impedance for coupling the screen grid to a source of control signals for controlling the power delivered by the coil.

4 Claims, 2 Drawing Figures

INVENTOR
HAL C. METTLER
BY
Christie, Parker & Hale
ATTORNEY

TUNED-PLATE TUNED-GRID SHORT WAVE SIGNAL GENERATOR WITH POWER OUTPUT CONTROLLED BY SCREEN GRID

CROSS-REFERENCE TO RELATED APPLICATIONS

This application is a division of my co-pending application Ser. No. 846,012 filed July 30, 1969 Now U.S. Pat. No. 3,638,657.

BACKGROUND OF THE INVENTION

1. Field of the Invention

This invention relates to signal generators and, more particularly, to an improved control for a tuned plate, tuned grid oscillator for generating short wave signals.

2. Description of the Prior Art

Short wave diathermy circuits are known for applying high frequency electromagnetic waves through the tissues of a patient for therapeutic purposes. One type has a single tube and pads for applying the diathermy signals to the patient. However, the harmonics formed by this device are prohibitive and the circuit requires a very high ratio of capacitance to inductance necessitating a very high idling current. An amplifier-oscillator type of circuit is also known having a patient resonating circuit. The amplifier-oscillator type of prior art diathermy is much more costly than the first device. Both of the aforementioned devices are very sensitive and require precise tuning. Mere breathing of the patient detunes the device. Technicians operating these devices have a very difficult time tuning them.

To alleviate the problem of tuning, one prior art diathermy has a tracking circuit to keep the circuit in tune, but it is much more costly. All of the aforementioned devices suffer from the disadvantages that large harmonics are generated and a faraday shield or other isolation circuit is required to shield the harmonics formed in the oscillator circuit from the patient reasonating circuit.

All of the aforementioned diathermies suffer from the deficiency that the power being delivered to the patient cannot be measured and indicated. This problem arises for a number of different reasons, all related to the design of these devices. For example, patient pads or cable electrodes used to apply the diathermy energy to the patient use long leads which are required to couple the patient electrodes to the oscillator and, as a result, energy is radiated into the atmosphere from the leads. There is no way of measuring the power being radiated and, hence, the power delivered to the leads cannot be used as a measure of power delivered to the patient.

An improved short wave diathermy circuit has been proposed in which the coil in the tuned plate circuit of the vacum tube oscillator is used to directly apply short wave diathermy signals to the patient undergoing treatment. In this manner, the patient resonating circuit can be eliminated, thus eliminating the problem of keeping the circuit tuned. However, the improved circuit has never been used commercially because it generates a prohibitive amount of energy at harmonic frequencies related to the fundamental frequency being applied to the patient. These harmonic frequencies interfere with communications and cannot be tolerated as they conflict with the rules laid down by the Federal Communications Commission with respect to the band of permissible frequencies for this type of equipment.

SUMMARY OF THE INVENTION

The present invention is directed to an improved circuit over that employed in the aforementioned diathermies in which signals are applied directly from the coil in the tuned plate circuit to the patient. The broad concept of the present invention involves means connected to the screen grid for enabling the fundamental frequency of oscillation in the plate circuit to be fed back from the plate circuit through the screen grid to the corresponding control grid and comprises an impedance coupled to the screen grid. Preferably, a source of screen control voltage is connected through the impedance to the screen grid for controlling the power output of the oscillator circuit. As a result, the harmonics formed by the circuit are lowered to an acceptable level. Using the present invention, it has been found that the output of the power oscillator circuit can be precisely controlled using the source of screen control voltage.

A preferred embodiment of the invention has a pair of tubes in a push-pull tuned plate, tuned grid oscillator circuit, each tube having a screen control grid. An impedance couples each control grid to a source of control signals for the circuit.

A preferred form of the invention utilizes a beam tube for the vacum tube.

In summary, a short wave signal generator circuit in accordance with the present invention has marked advantages over those above mentioned. For example, the troublesome harmonics which interfere with communications are virtually eliminated, and the power output can be precisely controlled using the screen control voltage. All body areas of a patient undergoing treatment can be treated by appropriate setting only of the screen control voltage. The device is always in tune and hence no tuning is required. Additionally, there is no power loss from patient or cable radiation. High voltage plate transformers, expensive power tubes and rectifier tubes are not required. Additionally, the oscillator and patient coil can e housed right in the treatment head of the device which allows the long dangling cables of the patient electrodes to be eliminated.

Another important feature is that a meter circuit can be added in series with the power supply for the circuit and can be used to indicate true power being drawn by the patient undergoing treatment.

Although the invention is preferably adapted for and has highly unusual features and advantages for use in combination in a short wave diathermy, it is felt that the invention in the oscillator circuit has wider applications in other applications, including, but not limited to, induction heaters and radio frequency generators and is within the broader scopes of this invention.

DESCRIPTION OF THE PREFERRED EMBODIMENT

Figure 2:
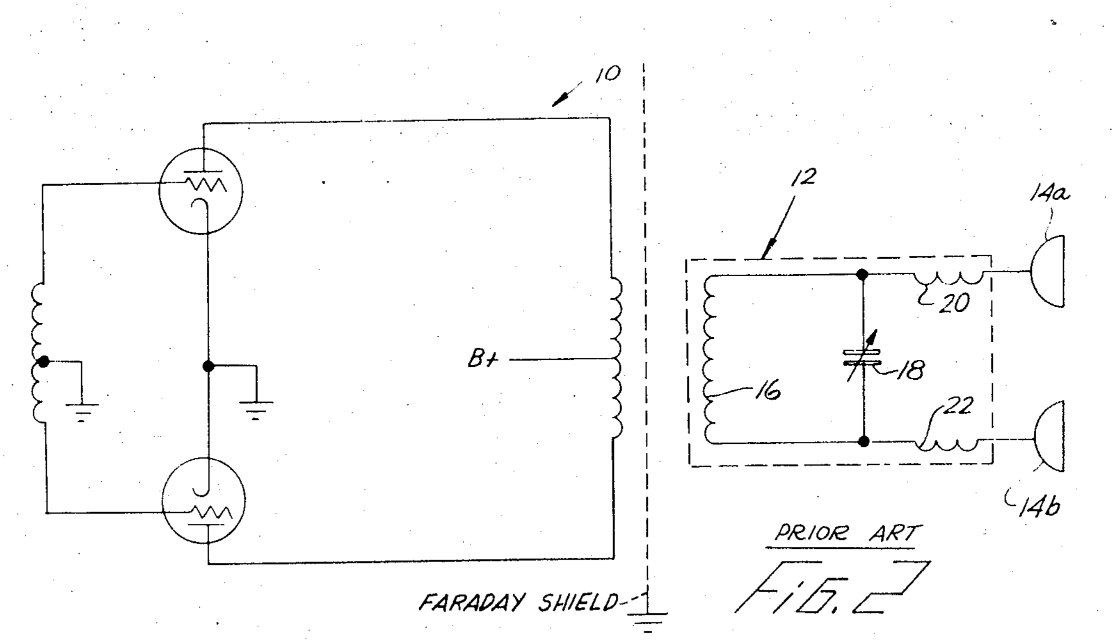
FIG. 2 is a schematic diagram showing a prior art short wave diathermy unit.

Before considering the present invention, consider the prior art diathermy circuit presently used commercially, as shown in FIG. 2. The prior art diathermy circuit employs a conventional tuned plate, tuned grid circuit employing a pair of triodes connected in a conventional push-pull relationship well known in the electronic circuit art. A tuned plate, tuned grid circuit of the type shown in FIG. 2 is shown in FIG. 112(*g*) of the book entitled *Radio Engineering* by Terman, published by the McGraw-Hill Book Company, Inc., New York and London, 1932. To the right of the push-pull tuned grid, tuned plate circuit is a patient resonating circuit 12. The patient resonating circuit includes a tuned circuit having a coil 16 magnetically coupled to the coil in the plate circuit of the oscillator 10 and a variable capacitor 18. The coil 16 and capacitor 18 are connected in parallel. Each side of the parallel connection of the coil and capacitor is connected to patient pads, cable, or drun 14(*a*) and 14(*b*) through inductors 20 and 22. Control over the power applied to the patient is achieved by tuning the patient resonating circuit to just off the oscillator frequency. This adjusts the power coupled into the patient resonating circuit. The coupling between coil 16 and the oscillator plate circuit coil is fixed. A faraday shield is provided in between the oscillator circuit 10 and the patient resonating circuit 12.

Figure 1:
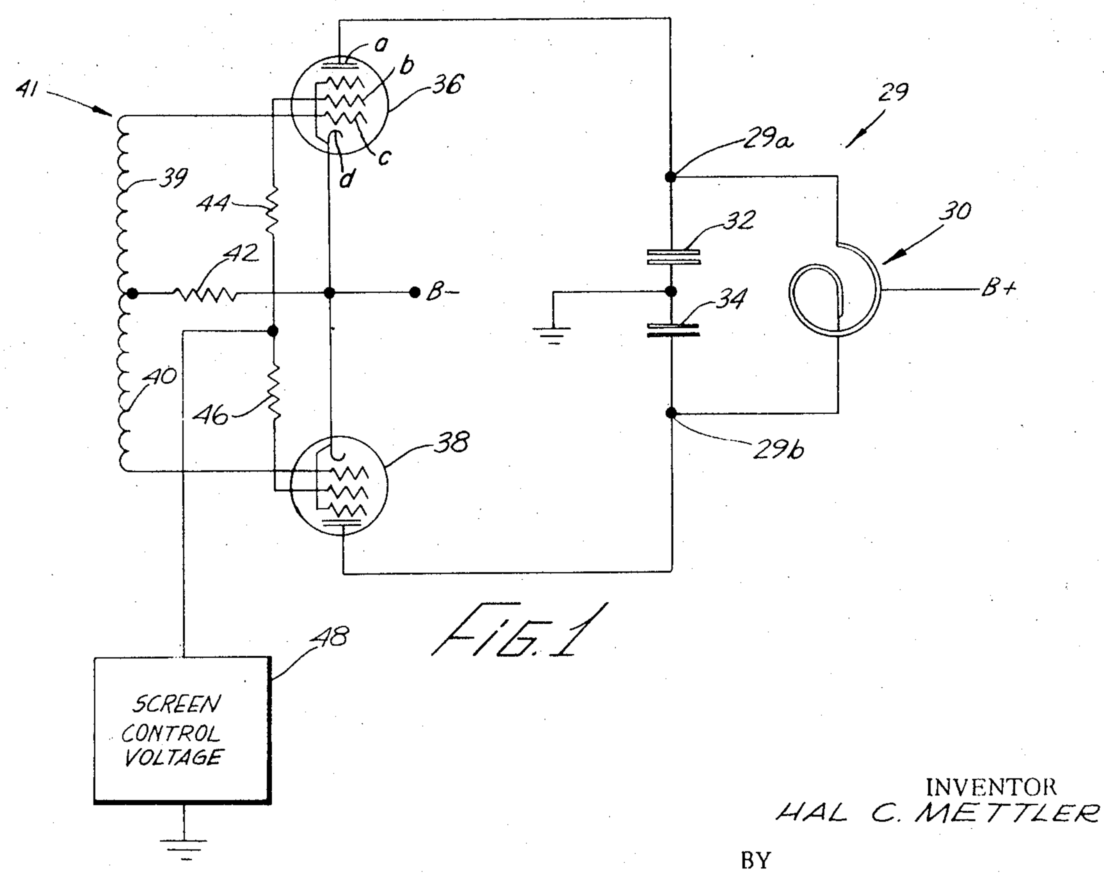
FIG. 1 is a circuit diagram of a short wave diathermy circuit and embodying the present invention.

Consider now the present invention as shown in FIG. 1. The circuit includes a helical induction coil 30 for applying the short wave diathermy signals directly to the patient undergoing treatment.

The center tap of the coil 30 is connected to B+ source of potential. The ends of the coil 30 are connected across two series connected capacitors 32 and 34. The coil 30 and capacitors 32 and 34 form a tuned tank circuit for the plate circuit of the oscillator. The junction between the two capacitors 32 and 34 is connected to ground potential. It will be evident to those skilled in the art that each capacitor 32 and 34 may comprise two or more capacitors connected in parallel to make up the desired capacitance.

The two sides of the tank circuit 29 are labeled 29(*a*) and 29(*b*) and are connected to the plate electrodes of a pair of beam vacuum tubes 36 and 38, respectively. Each tube has a plate *a*, a screen grid *b*, a control grid *c*, and a cathode *d*. It should be understood that the invention is not limited to use of a beam tube but any tube having at least the aforelisted electrodes and similar characteristics may be used.

The cathodes of the pentodes 36 and 38 are connected together to a B— source of potential.

The tuned grid circuit is shown generally at 41 in FIG. 1. the tuned grid circuit includes an inductive coil 39–40 coupled between the control grids of the two tubes. This coil is center-tapped and the center tap is connected to the cathodes through a resistor 42 which is provided to limit the current passing through the grid coil 39–40. The resistor 42 is a very high impedance and hence the cathodes are not directly connected to the center tap. The grid to cathode capacitances (not shown) of the tubes 36, 38 are in series across the ends of the grid coil 39–40 to form the tuned grid circuit.

Resistors 44 and 46 connect the screen grids *b* of the pentodes 36 and 38, respectively, to a source of screen control voltage 48.

The upper and lower halves of the oscillator circuit shown in FIG. 1 each form a conventional tuned plate, tuned grid circuit of the type described in the above-mentioned book entitled *Radio Engineering*. The two halves are connected together in a conventional push-pull fashion well known in the oscillator circuit art. Accordingly, a description of the operation of the oscillator circuit will not be given, and a more complete understanding thereof can be had with reference to the above referenced book entitled *Radio Engineering*.

However, the control for the power delivered to the patient through the coil 30 whould be noted. The amount of power is controlled by the voltage output from the source of screen control voltage 48.

In one embodiment of the invention, the screen control voltage 48 varies between 0 and 140 volts, causing power to be delivered by the coil 30 to a patient varying between 0 and 100 watts.

The screen resistors 44 and 46 are of considerable importance to the present invention. It should be noted that the screen resistors 44 and 46 are each of such a value that the screen grids retain their ability to control the power to the circuit and yet large enough to allow the fundamental short wave frequency to be fed back from the plate circuit through the screen grid to the control grid and thereby sustain oscillation in the circuit. Most known osillator circuits of this type are only triodes and do not utilize a screen grid for control. By utilizing a tube with a screen grid and connecting the screen resistors as shown, significantly improved results are obtained by eliminating the undesirable harmonics which prevented diathermy circuits of this type from being useful in the past.

The values of the resistors 44 and 46 do not appear to be critical and it has been found that resistors may be selected by placing a variable resistor in place of the resistors 44 and 46 and varying them until the desired power output control is obtained. However, it has been found that the undesirable harmonics are filtered out better as the value of resistors 44 and 46 is increased, up to the point where the screen grids lose control of the power output.

Table I shows the values of the various elements shown in the diathermy circuit of FIG. 1 for a preferred embodiment.

Although one example of the present invention has been shown by way of illustration, it should be understood that there are many other rearrangements and embodiments of the present invention within the scope of the following claims.

TABLE I

| | | |
|---|---|---|
| 29 | - | tuned to 27.2 MHZ |
| 41 | - | tuned to 32.5 MHZ |
| 30 | - | 0.4 microhenries |
| 32 | - | 140 pico farads |
| 34 | - | 140 pico farads |
| 36 | - | type 6 HF5 beam tube |
| 38 | - | type 6 HF5 beam tube |
| 39—40 | - | 2.5 microhenries |
| 42 | - | 5.6 K ohms |
| 44 | - | 2.7 K ohms |
| 46 | - | 2.7 K ohms |
| 48 | - | 0 to 140 volts |
| B+ | - | +600 volts |
| B— | - | 0 volts |

I claim:

1. A signal generator for generating short wave signals comprising at least one vacum tube in a tuned plate, tuned grid oscillator circuit having a coil in the tuned plate circuit for providing high frequency signals, the tuned plate circuit oscillating at a fundamental short wave frequency, said tube having at least a control grid connected to the tuned grid circuit and a screen grid, a source of screen control potential and means coupled to said screen grid for enabling said fundamental frequency to be coupled from said plate circuit to said screen grid and then to said control grid for oscillatory feedback, and comprising an impedance for coupling the screen grid to said source of control potential for controlling the power delivered by the coil.

2. A signal generator comprising a pair of vacum tubes in a push-pull tuned plate, tuned grid oscillator circuit having a coil in the tuned plate circuit for providing short wave signals, the tuned plate circuit oscillating at a fundamental short wave frequency, each of said tubes having at least a control grid connected to the tuned grid circuit and a screen grid, a source of screen control potential and means coupled to each screen grid for enabling said fundamental frequency to be fed back from the said plate circuit through each screen grid to the corresponding control grid and comprising an impedance for each screen grid for coupling the corresponding screen grid to said source of screen control potential for controlling the power delivered by the coil.

3. A signal generator according to claim 2 wherein the said tuned plate circuit is tuned to a different frequency than that of said tuned grid circuit.

4. A signal generator according to claim 3 wherein the frequency at which said tuned plate circuit is tuned is lower than that of said tuned grid circuit.

* * * * *